United States Patent [19] [11] 4,171,398
Hunt [45] Oct. 16, 1979

[54] TRANSFER SHEET

[76] Inventor: Delbert R. Hunt, 2860 Amherst Ave., Fullerton, Calif. 92631

[21] Appl. No.: 846,711

[22] Filed: Oct. 31, 1977

Related U.S. Application Data

[63] Continuation-in-part of Ser. No. 730,224, Oct. 6, 1976, abandoned, which is a continuation-in-part of Ser. No. 597,921, Jul. 21, 1975, abandoned.

[51] Int. Cl.[2] .......................... B32B 7/06; B44C 1/16

[52] U.S. Cl. .................................. 428/195; 156/234; 156/240; 427/147; 428/200; 428/207; 428/914

[58] Field of Search .............. 156/234, 239, 240, 249; 427/146-149, 152; 428/40, 195, 200, 206, 207, 346-350, 354, 355, 914

[56] References Cited

PUBLICATIONS

Modern Plastics Encyclopedia, vol. 50: No. 10 A, Oct. 1973, pp. 170 and 171.

*Primary Examiner*—George F. Lesmes
*Assistant Examiner*—Bruce H. Hess
*Attorney, Agent, or Firm*—William F. McDonald

[57] ABSTRACT

A transfer comprising a non-opaque flexible backing having a non-opaque film (heat stable below 350° F. (177° C.) on one surface of the backing. A coating of dry non-activated adhesive is on the surface of the film not on the backing.

9 Claims, 2 Drawing Figures

TRANSFER SHEET

REFERENCE TO FIRST APPLICATION

This application is a continuation-in-part of application Ser. No. 730,224, filed Oct. 6, 1976 now abandoned, which in turn is a continuation-in-part of application Ser. No. 597,921 filed July 21, 1975, now abandoned.

BACKGROUND OF THE INVENTION

The present application relates to transfers such as decalcomania and the like adapted to be transferred from a backing to a further support such as a wall or the like.

Transfers consisting of a carrier or backing sheet carrying an image which can be transferred from the backing to a further support are fundamentally well known. Historically, the first significant transfers required the application of water to release the image from the carrier or backing. These transfer materials were usually difficult to make, complicated in construction, and difficult to store without deterioration. Further, after application there was frequently a yellowing of the non-opaque film which supported the image. In more recent years, transfers from which the image could be transferred without the use of any liquid have been developed. These materials utilize either heat or pressure activated adhesive formulations whereby the image is adhered to the subsequent display surface. These materials are quite effective but some problems still remain.

With the prior art transfers the adhesive layer, whether dealing with a liquid activated adhesive or a heat or pressure activated adhesive, was interposed between the image and the supporting surface. Because of this, frequently the image would blur or break in its application to the surface, and during subsequent exposure on the surface. Further, because of the way these structures had to be made, it was normally not practical for a user to prepare his own transfers, a protective backing or carrier sheet being above the image layer. The transfer had to be prepared by specialty shops with special equipment. With the development of modern electrostatic printing processes there has developed a need for a transfer wherein the user can prepare his own image and with it prepare his complete transfer.

SUMMARY OF THE INVENTION

It is an object of the present invention to provide a transfer wherein the user can utilize his own images for application to a surface. An advantage of the present invention is that it is applicable to any of the prior art systems utilizing liquid activated adhesives, heat activated adhesives, and pressure activated adhesives. It is further an advantage of the present invention that the images can be prepared by any conventional method such as conventional printing, electrostatic printing, the use of carbon paper, and conventional inking processes. The present invention relates to a transfer which comprises a non-opaque flexible backing having a non-opaque film heat stable below 350° F. (177° C.) on the surface of the backing. A coating of dry, non-activated adhesive is on the surface of the film not on the backing. The image is applied to the surface of the coating of adhesive not on the surface of the film.

Other objects and advantages of the present invention will be apparent from the following detailed description in conjunction with the accompanying drawings.

DETAILED DESCRIPTION

Figure 1:
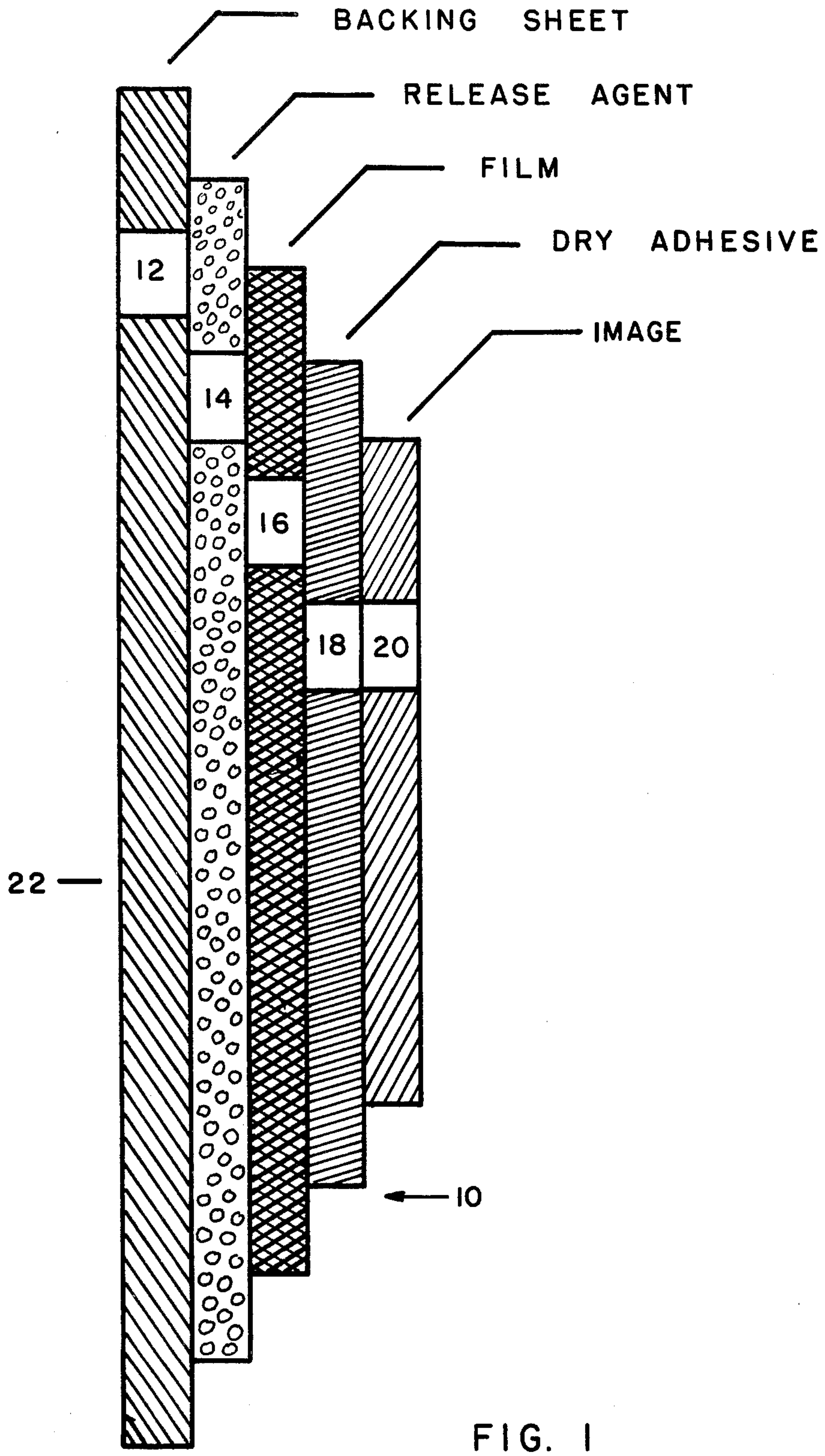
FIG. 1 is a side elevational view, in section, of an embodiment of the present invention.

Referring now to the drawings, wherein like numerals have been used for corresponding parts, a transfer in accordance with the present invention is indicated at 10. A non-opaque, either transparent or translucent, flexible backing or carrier sheet is indicated at 12. Backing 12 may be of any suitable material such as polyethylene terephthalates or polyethylene or the like. If the image is to be applied in an electrostatic process where the material is subjected to an elevated temperature for a very limited period of time, it may be desirable to treat or heat shrink backing 12 to increase its heat resistance in the electrostatic copier. In this form the backing 12 must still be flexible, but at the same time have sufficient rigidity, as is known to those in the art, to feed an electrostatic copying machine. The heat resistance of backing 12 can be increased by utilizing for example a polyester mixed with a thermo resin which makes it capable of receiving heat in a temperature rate from about 100° F. to about 450 degrees F. (38° C.-232° C.). Alternatively, for example, a heat shrunk material such as heat shrunk polyethylene terephthalate may be used.

A coating of a suitable release agent 14, such as known in the art, is on one surface of backing 12 in the embodiment shown in FIG. 1. Although release agents are generally known in the art, a particularly effective release agent for coating 14 is comprised of 96 parts of water, preferably distilled, 2 parts of isopropyl alcohol, and two parts of a chrome complex known in the trade as Quilon. A Quilon chrome complex is a dark, blue-green, chemically reactive, water soluble, Werner type complex in which a $C_{14}$–$C_{18}$ fatty acid is coordinated with chromium. This release agent is effective to releasably hold non-opaque, either transparent or translucent, film 16 on the surface thereof not on the surface of backing 12 until such time as it is to be released in the use of transfer 10. Film 16 may be made from any suitable material known in the art, although polyvinyl chloride is particularly effective. Again, if transfer 10 is to be utilized in conjunction with an electrostatic copying process, a material for film 16 must be selected which has the necessary heat resisting property. Specifically a material, such as polyvinyl chloride which is heat stable below 350° F. (177° C.) must be used if transfer 10 is to be utilized in conjunction with an electrostatic copying process. This, of course, would also be true for the other materials if a heat sensitive adhesive is to be used.

Figure 2:
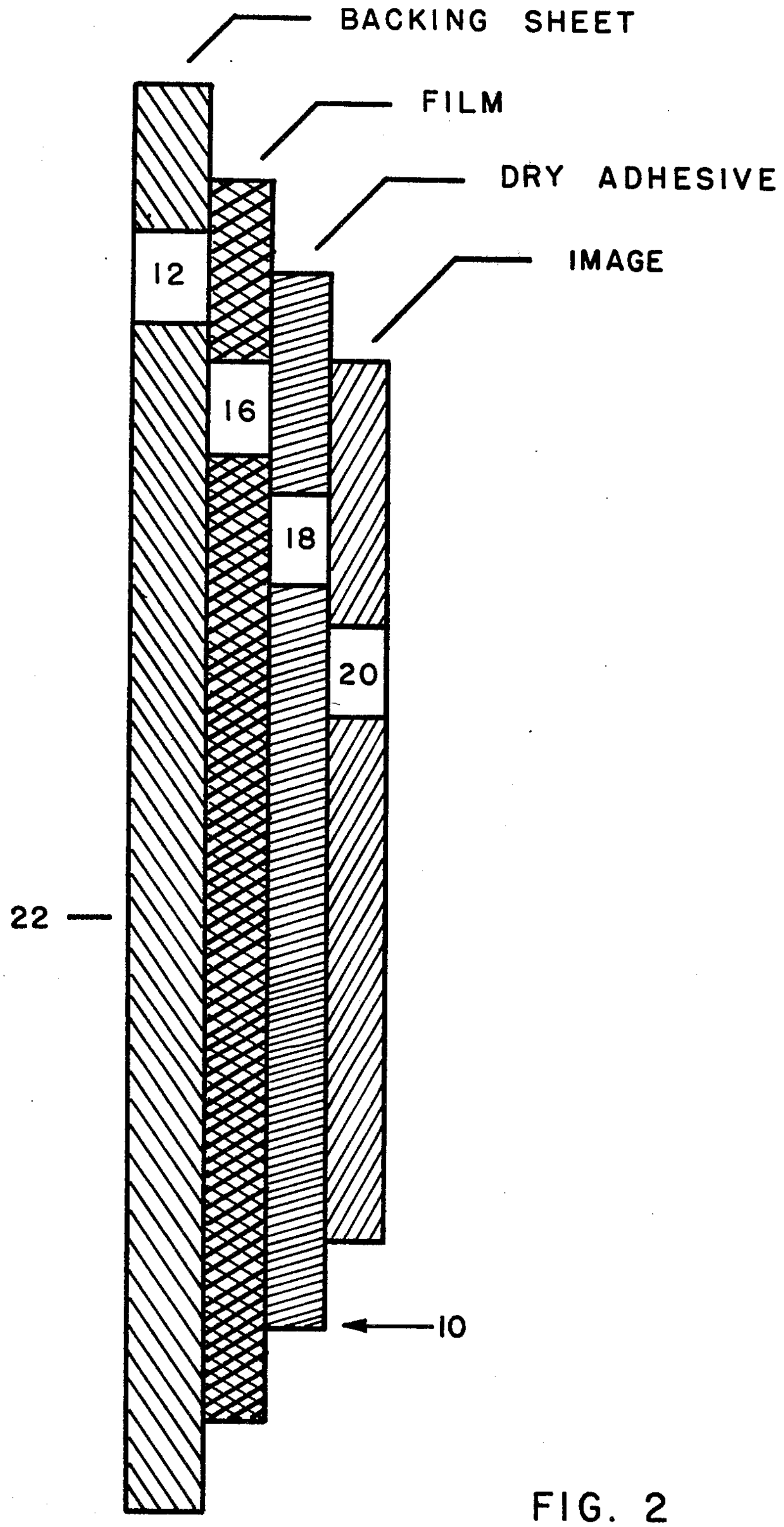
FIG. 2 is a side elevational view, in section, of another embodiment of the present invention.

If a material is used for backing 12 which inherently has good release properties such as polytetrafluoroethylene and high density polyethylene, no release agent 14 is needed. In this case, as shown in FIG. 2, film 16 may be immediately on backing 12 rather than mediately through release agent 14.

A coating of adhesive 18 is on the surface of film 16 not on adhesive 18. Adhesive 18, although in a dry, non-activated form as part of the transfer, may be either a liquid activated adhesive, a chemically activated adhesive, a heat activated adhesive, or a pressure activated adhesive.

A particularly effective composition for a pressure activated adhesive comprises about 3 parts by weight of a low viscosity polyvinyl ether, 5.6 parts by weight of a high viscosity polyvinyl ether, 0.4 parts by weight of a low molecular weight polyethylene base wax, 2.8 parts by weight of silica powder, 76 parts by weight of aliphatic hydrocarbon, such as that commonly referred to as "white spirits" or "Stoddard Solvent," which may contain 3% by weight of an aromatic hydrocarbon, and 12.2 parts by weight of glycolic ether. This pressure activated adhesive is particularly desirable where the image is to be applied to the rest of the transfer by an electrostatic copier in that it will not be activated by the temperatures encountered in the copier.

An image 20 of a material, which in the form when ready to apply to a surface is dry, is on the surface of adhesive coating 18 by divers means. Image 20 can be directly printed on the surface of adhesive 18 using any conventional printing means, such as painting, silk screening, printing press, and the like, care being taken not to apply sufficient pressure to activate adhesive 18 if it is of the pressure activated type. Image 20 can also be applied using carbon paper, for example, putting the rest of transfer 10 in a typewriter with a sheet of carbon paper, the carbon paper being reversed so that when the keys are struck, the carbon is transferred to the surface of adhesive 18.

If an electrostatic copier is to be used to apply image 20 to adhesive 18, the rest of transfer 10, including adhesive 18, is loaded into the feed of the copying machine. The image to be copied is positioned on the machine in the normal manner. The resins utilized by such machines will be electrostatically deposited and bonded together to form image 20 on the surface of adhesive 18 not in contact with film 16. Therefore, image 20 will comprise a tackified and solidified electroscopic powder.

In use, transfer sheet 10, including the image 20 which has been applied thereto, is positioned over the surface to which the image is to be transferred, image 20 touching such surface. If a pressure activated adhesive is used, the front or upwardly exposed surface 22 of backing sheet 12 is rubbed with a blunt instrument over the area to be transferred until film 16 in that area, by the action of release coating 14, or because of the inherent release properties of backing sheet 12, releases from backing sheet 12. Simultaneously therewith, adhesive 18 is activated by the pressure of the blunt instrument and will adhere to the surface to which the image is to be applied, carrying with it image 20 and as a coating for image 20, film 16 in that area. Backing sheet 12 is then removed from the object and the portion of film 16 which has been transferred to the object along with adhesive 18 and image 20 is then burnished with the blunt instrument to complete the adhesion. The result is that image 20 is sandwiched between film 16 and the surface and held there by adhesive 18. Thus, the image is protected from any deterioration or smearing. It should be apparent that analogous transfer means can be utilized if a heat activated adhesive or a liquid or chemical activated adhesive is used as part of transfer 10.

From the above description it should be apparent that the present transfer provides the ability to prepare images on printing devices such as rotary presses, offset presses, letter presses, electrostatic copiers and the like, which images when applied to objects are sealed between a non-opaque film and the object. Thus, the present invention provides a novel method of preparing on an as needed basis identifications for engineering drawings, graphs, charts, and other forms of artwork by use of dry transfer symbols, words, sentences, or paragraphs. An individual has the ability to prepare his own transfers utilizing any image he chooses. This ability to provide images as necessary that in effect become an integral part of the adhesive coating and are sealed with a film layer is a very important advantage of the present invention.

It will be appreciated that while there have been shown and described hereinabove possible embodiments of this invention, it is to be understood that the invention is not limited thereto, and that various changes, alterations, and modifications can be made thereto without departing from the spirit and scope thereof as defined in the claims, wherein:

What is claimed is:

1. A transfer consisting of:

(a) a non-opaque flexible backing;

(b) a non-opaque film heat stable below 350° F. (177° C.) on one surface of the backing;

(c) a coating of dry-non-activated adhesive on the surface of the film not on the backing;

(d) an image of dry material on the surface of the coating of adhesive not on the surface of the film.

2. The transfer of claim 1 wherein the adhesive is a pressure activated adhesive.

3. The transfer of claim 1 including the following additional element:

(a) a coating of a release agent on one surface of the backing and interposed between the backing and the non-opaque film.

4. The transfer of claim 3 wherein the release agent comprises about:

(a) 96 parts by weight of water;

(b) 2 parts by weight of isopropyl alcohol;

(c) 2 parts by weight of a water soluble, Werner type complex in which a $C_{14}$–$C_{18}$ fatty acid is coordinated with chromium.

5. The transfer of claim 1 wherein the image of dry material is applied to the surface of the coating of adhesive not on the surface of the film by an electrostatic bonding process.

6. The transfer of claim 1 wherein the image of dry material applied to the surface of the coating of adhesive not on the surface of the film comprises a tackified and solidified electroscopic powder.

7. A transfer comprising:

(a) a non-opaque flexible backing;

(b) a non-opaque film on one surface of the backing;

(c) a coating of pressure activated adhesive on the surface of the film not on one surface of the backing; and wherein the adhesive comprises about:

(i) 3 parts by weight of a low viscosity polyvinyl ether;

(ii) 5.6 parts by weight of a high viscosity polyvinyl either;

(iii) 0.4 parts by weight of a low molecular weight polyethylene base wax;

(iv) 2.8 parts by weight of a silica powder;

(v) 76 parts by weight of white spirits; and (vi) 12.2 parts by weight of glycolic ether;

(d) an image of dry material on the surface of the coating of adhesive not on the surface of the film.

8. The transfer of claim 7 including a coating of a release agent on one surface of the backing and interposed between the backing and the non-opaque film.

9. The transfer of claim 7 wherein the non-opaque film is heat stable below 350° F. (177° C.).

* * * * *